2,695,427

METHOD OF MAKING CELLULAR PRODUCTS FROM VINYLIDENE CHLORIDE COPOLYMERS

Theodore W. Sarge and Frank H. Justin, Midland, Mich., assignors to The Dow Chemical Company, Midland, Mich., a corporation of Delaware No Drawing. Application June 25, 1952, Serial No. 295,548

7 Claims. (Cl. 18—57)

This invention relates to a method of making foamed or spongy cellular articles from copolymers of vinylidene chloride and vinyl chloride.

Many thermoplastics have been converted from their normally dense condition to voluminous masses having foamed or spongy structure. The commonest method involves heating the plastic in the presence of a highly volatile solvent, under pressure, and then discharging the solution to atmospheric pressure whereupon the solvent expands and a cellular structure is obtained in the plastic. Such methods have the disadvantage that most of the volatile agents employed are either highly flammable or are toxic, or both. The plastics which are susceptible to such treatment have the disadvantage of being flammable, or of having very low softening points. Since one of the principal uses for the foamed plastics is as insulation, the products have been limited to uses in which low temperatures prevail and in which there is little fire hazard. Some plastics cannot be foamed by the common methods because they do not dissolve in the volatile solvents, or because they are decomposed by the necessary prolonged exposure to heat in the process. Another method, which has been used to make foam rubber, especially in Germany, involves mixing rubber with a "Porofor" (for example, azo-bis-isobutyronitrile), and heating the mixture to cause the azo compound to decompose. The so-released nitrogen forms bubbles or cells in the rubber, producing foamed articles. This method has met with little success when it has been tried with the synthetic linear polymers.

It would be desirable to provide a method whereby a substantially non-flammable thermoplastic can be converted to cellular articles without need for flammable or toxic solvents. It would be desirable as well to provide such a method which can be used to make cellular articles from plastics which are substantially insoluble in the highly volatile solvents and which have softening points above 100° C., so that the fields of use of the articles are not too severely restricted. It would be especially desirable to provide such a method whereby the copolymers of vinyl chloride and vinylidene chloride, including those which soften above 100° C., may be converted to cellular articles. It is the object of the present invention to provide a method whereby the enumerated and related desired ends may be attained.

The process of the present invention, whereby the foregoing objects are realized, comprises forming an intimate powder mixture of an alkali metal bicarbonate and a copolymer of from 25 to 90 per cent vinylidene chloride and complementarily from 75 to 10 per cent vinyl chloride, and heating the mixture rapidly to its fusion temperature, but not above 200° C., by exposure to radio-frequency oscillations. Any alkali metal bicarbonate may be used, and the amount of bicarbonate in the mixture may be from 1 to 15 per cent of the weight of the composition. If desired, the copolymer may contain up to to 10 per cent of its weight of a plasticizer. The powder mixture may be compacted slightly, or it may be piled loosely and exposed to the high frequency field for the two minutes or less required to heat the mass of copolymer to its fusion temperature. When the copolymer melts, it is found that the bicarbonate is decomposed with liberation of carbon dioxide, and the latter is prevented from escaping by the surrounding molten copolymer. In consequence, the entrapped carbon dioxide expands the copolymer with formation of internal, closed cells. The heating period is kept as brief as possible, and the foamed product is removed from the high frequency field before significant discoloration has been induced by the heat. When cooled, the foam product is tough and hard enough to be cut to desired shapes for use as structural insulation slabs or as buoyancy blocks for life jackets or other articles intended to float on liquids.

The process is not applicable to the homopolymer of vinylidene chloride or to that of vinyl chloride, as these materials simply char in the high frequency field at the high temperatures required to melt them, and the product is not useful. Neither is it applicable to any polymeric material which cannot be heated to its melting point in a radiofrequency field, examples of such polymers being polystyrene, polyethylene and polytetrafluoroethylene.

The alkali metal bicarbonates are apparently unique in their effect in the process, as attempts to replace them with such other compounds as the ammonium and alkali metal carbonates met with failure consistently.

The method of heating, or the source of heat, is believed to be critical to the process. The copolymers which have been found useful have a limited period of usefulness at temperatures near their fusion points, and, due to their low thermal conductivities, they may be badly decomposed when heated principally by conduction through walls of a heat exchanger before the entire mass is molten. In contrast, the same copolymers can be fused through dielectric loss in a few seconds by exposure to radiofrequency waves at known intensities, and the fused product can be removed from the field before any significant darkening occurs.

The degree of foaming induced in the mixture of the copolymer and bicarbonate varies with (1) the time of exposure to high frequency, (2) the distance of the electrodes from the copolymer mixture to be foamed, and (3) the concentration of the bicarbonate in the mixture. Thus, the copolymer must be heated to a melting temperature before foaming starts and foaming will continue until the bicarbonate is all decomposed if that temperature is maintained. The intensity of the field and its effect on the copolymer is inversely proportional to the square of the distance between the electrodes. Other factors being constant, the more bicarbonate in the mixture, the greater is the potential amount of expansion. The minimum effective amount of bicarbonate is of the order of 1 per cent of the weight of the copolymer-bicarbonate mixture, and no material advantage is obtained by increasing the amount of bicarbonate beyond 15 per cent of the weight of said mixture. The most generally useful concentrations of bicarbonate are in the range from 7 to 15 per cent, to produce light, foamed structures.

The copolymer-bicarbonate mixture may be subjected to the excitation of the high frequency field with or without being pelleted or compressed, and may be so-treated in closed molds to produce foamed articles of predetermined shape or in an unconfined condition, and, in the latter case, operation may be batchwise or continuous. Thus, the powder mixture may be deposited as a continuous stream of any desired width and thickness on an endless moving belt and conveyed between high frequency electrodes at a rate of movement to assure melting of the copolymer and foaming of the composition, and the resulting continuous strip of foamed plastic may be cooled, whereupon it becomes tough and stiff and can be sawed or otherwise cut to desired sizes and shapes.

The following table illustrates the results obtained under various conditions defined in the table. The radio-frequency field had a potential defference of 5000 volts and a frequency of 35 megacycles.

| No. | Composition | | | | | Time of exposure to radio-frequency field, seconds | Volume of foamed products |
|---|---|---|---|---|---|---|---|
| | Copolymer | Percent by weight | Bicarbonate | Percent by weight | Physical form | | |
| 1 | Vinylidene chloride—85<br>Vinyl chloride—15 | 90 | NaHCO₃ | 10 | Compressed pellet 1.375 inch diameter, 0.25 inch thick. | 40 | 1.625 inches x .375 inch. |
| 2 | ....do.... | 90 | NaHCO₃ | 10 | ....do.... | 45 | 2.5 inches x .625 inch. |
| 3 | ....do.... | 90 | NaHCO₃ | 10 | ....do.... | 50 | 2.875 inches x .75 inch. |
| 4 | ....do.... | 90 | NaHCO₃ | 10 | ....do.... | 75 | 4.875 inches x 1.5 inches. |
| 5 | ....do.... | 90 | NaHCO₃ | 10 | ....do.... | 90 | 5.625 inches x 2.625 inches. |
| 6 | ....do.... | 93 | KHCO₃ | 7 | ....do.... | 55 | 3 inches x .75 inch. |
| 7 | ....do.... | 85 | KHCO₃ | 15 | ....do.... | 55 | 4.5 inches x 1.375 inches. |
| 8 | Vinylidene chloride—73<br>Vinyl chloride—27 | 95 | NaHCO₃ | 5 | ....do.... | 75 | 3 inches x .9 inch. |
| 9 | Vinylidene chloride—25<br>Vinyl chloride—75 | 97 | NaHCO₃ | 3 | ....do.... | 90 | 2.5 inches x .625 inch. |
| 10 | Vinylidene chloride—100 | 90 | NaHCO₃ | 10 | ....do.... | 60 | Charred. No useful foam. |
| 11 | Vinyl chloride—100 | 90 | NaHCO₃ | 10 | ....do.... | 60 | Do. |
| 12 | Vinylidene chloride—85<br>Vinyl chloride—15 | 90 | NaHCO₃ | 10 | Uncompressed pile of powder 6 inches wide and 0.5 inch thick, on moving belt. | 50 | Continuous strip 8 inches wide and nearly 1 inch thick. |

NOTE.—Some of the copolymers contained 5 to 10 percent plasticizer.

When it was attempted to produce an expanded foam from one of the same copolymers, using azo-bis-isobutyronitrile as the foaming agent in place of a bicarbonate, a badly discolored product was obtained after brief exposure to the field, and very little foaming was obtained even after prolonged exposure. The charred product was useless for the intended purpose.

As is shown in the table, the powdered homopolymer of vinyl chloride and that of vinylidene chloride failed to give useful products. When plastisols were made from equal amounts of such polymer and a plasticizer, and a bicarbonate was mixed therewith, and the mass was put in a mold and subjected to the high frequency field, the vinyl chloride polymer gave a soft rubbery foam, but the vinylidene chloride polymer still did not form a useful product. The vinyl chloride plastisol foam had too low softening point to be of use in many of the commoner applications, and it was too soft and limp for structural insulation.

Because of the long time required to bring the copolymer-bicarbonate mixture to a foaming temperature in a radiation or convection oven, such heating means cannot be substituted for the dielectric heating employed in this invention. When it is attempted to do so, a dark brown and slightly foamed product results.

The products of the invention are made from copolymers having densities up to 1.65, and the foamed products have densities as low as 0.25, depending on the amount of expansion which occurs before removing the article from the radiofrequency field. Samples of the foamed product have floated in water for several weeks without losing their buoyancy. The products are useful both as non-combustible insulation in buildings or in refrigerators and as buoyant articles in life belts, rafts and other articles intended to float in water or other liquids.

We claim:
1. The method which comprises forming a powder mixture of from 1 to 15 per cent of an alkali metal bicarbonate and correspondingly from 99 to 85 per cent by weight of a copolymer of from 25 to 90 per cent vinylidene chloride and from 75 to 10 per cent vinyl chloride, and subjecting such mixture to a radiofrequency field until the mixture attains a temperature less than 200° C. but at least as high as the softening point of the copolymer, and removing the resulting foamed product from the field before the copolymer chars.

2. The method claimed in claim 1, in which the mixture of bicarbonate and copolymer is compressed before exposure to the radiofrequency field.

3. The method claimed in claim 1, wherein the copolymer contains up to 10 per cent by weight of plasticizer.

4. The method claimed in claim 1, wherein the bicarbonate employed is sodium bicarbonate.

5. The method claimed in claim 1, wherein the bicarbonate employed is potassium bicarbonate.

6. The method claimed in claim 1, wherein the copolymer employed is about 85 per cent vinylidene chloride and about 15 per cent vinyl chloride.

7. The method claimed in claim 1, wherein the powder mixture is spread on a continuously moving belt and conveyed through the radiofrequency field to form a continuous foamed strip.

References Cited in the file of this patent

UNITED STATES PATENTS

| Number | Name | Date |
|---|---|---|
| 2,603,622 | Berger et al. | July 15, 1952 |
| 2,613,189 | Sarbach | Oct. 7, 1952 |

FOREIGN PATENTS

| Number | Country | Date |
|---|---|---|
| 605,519 | Great Britain | July 26, 1948 |